United States Patent [19]

Boudreaux

[11] Patent Number: 5,104,078
[45] Date of Patent: Apr. 14, 1992

[54] FENCE MOUNTING BRACKET

[76] Inventor: Brian J. Boudreaux, 699 Valerie Dr., Biloxi, Miss. 39532

[21] Appl. No.: 641,449

[22] Filed: Jan. 14, 1991

[51] Int. Cl.[5] ............................................. F16B 1/00
[52] U.S. Cl. .................................... 248/220.2; 256/32
[58] Field of Search ................. 256/32; 248/214, 215, 248/220.2, 223.3, 225.1, 235, 301, 231.2, 231.3; 403/43, 46, 48, 289, 290, 208

[56] References Cited

U.S. PATENT DOCUMENTS

| | | | |
|---|---|---|---|
| 1,461,626 | 7/1923 | Mason | 248/231.3 X |
| 1,581,109 | 4/1926 | Franke | 403/46 |
| 1,707,754 | 4/1929 | Bone | 248/231.3 X |
| 1,902,241 | 3/1933 | Jones | 248/214 |
| 2,471,839 | 5/1949 | Schumacher | 248/223.3 X |
| 2,553,074 | 5/1951 | Beard | 403/46 X |
| 3,279,620 | 10/1966 | Nesbitt | 248/214 |
| 3,295,812 | 1/1967 | Schneider et al. | 403/289 X |
| 3,329,451 | 7/1967 | Aeschliman | 403/402 |
| 4,117,629 | 10/1978 | Ekdahl 248 | 248/214 X |
| 4,306,661 | 12/1981 | Allsop | 248/223.3 X |
| 4,582,284 | 4/1986 | Veenstra | 256/32 X |
| 4,693,381 | 9/1987 | Lodge | 248/225.1 X |
| 4,724,967 | 2/1988 | Valiulis | 248/220.2 X |
| 4,899,970 | 2/1990 | Berzina | 248/215 X |

FOREIGN PATENT DOCUMENTS 418152 10/1934 United Kingdom ............... 248/215

*Primary Examiner*—Andrew V. Kundrat
*Attorney, Agent, or Firm*—Leon Gilden

[57] ABSTRACT

A bracket member arranged for mounting to an uppermost rail of a fence, with a "V" shaped body member formed of memory retentent material, wherein the body member is defined by a plurality of coextensive legs each formed with an arcuate groove adjacent a junction of the legs, and a mounting slot at free ends of each leg, wherein the grooves and slots are directed into the generally planar legs through opposed upper and lower edges of the legs to permit mounting of the legs upon a fence rail and provide the arcuate grooves for support of baskets and the like therefrom.

2 Claims, 4 Drawing Sheets

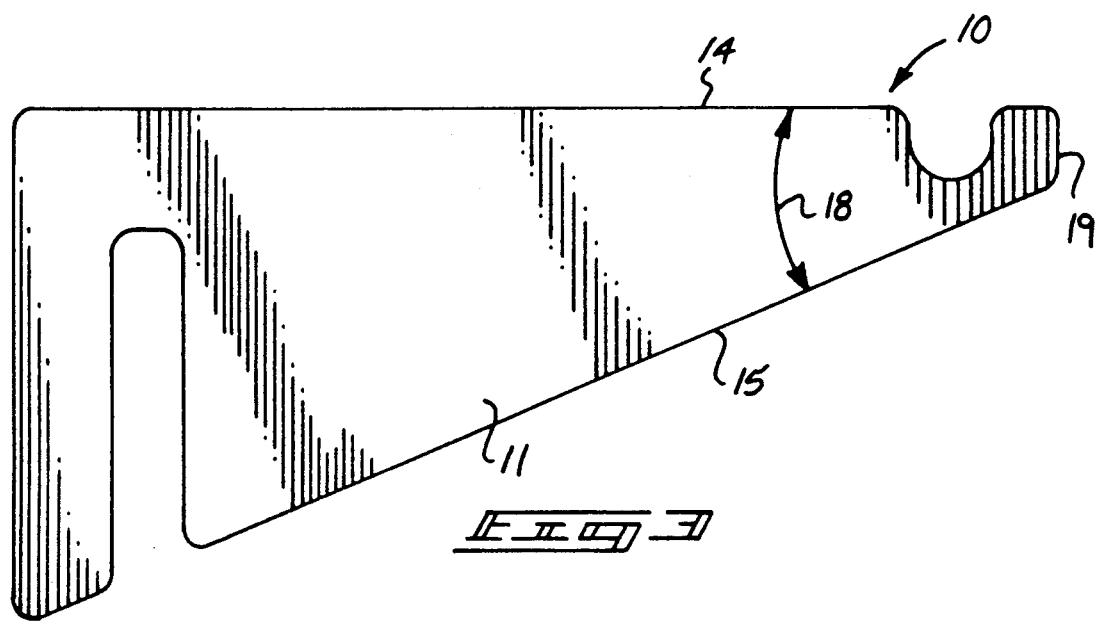
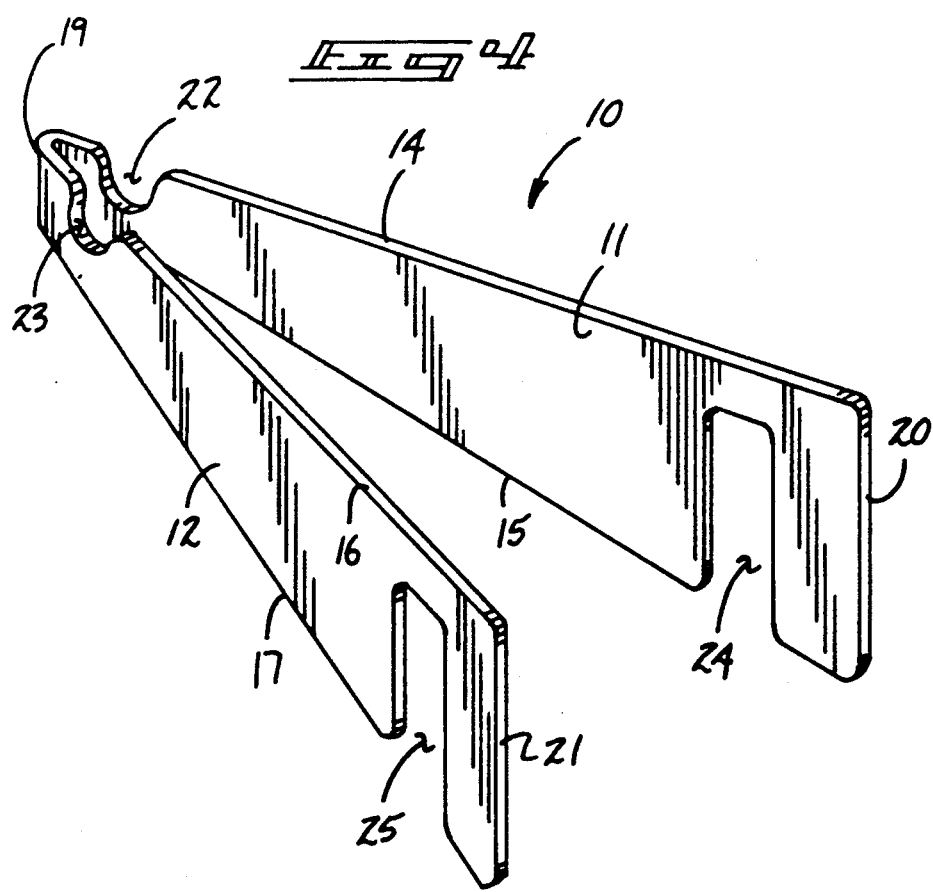

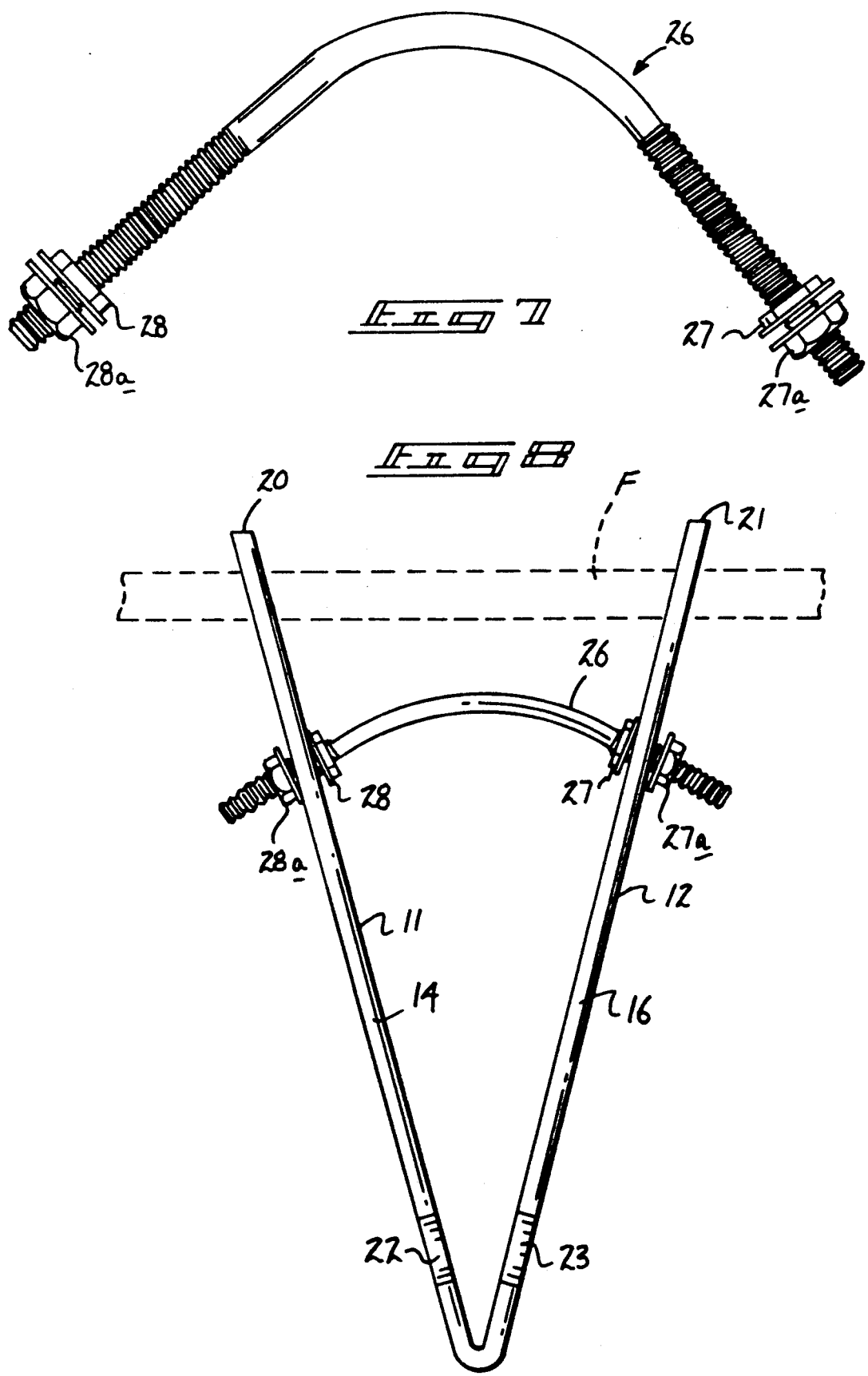

FENCE MOUNTING BRACKET

BACKGROUND OF THE INVENTION

1. Field of the Invention

The field of invention relates to bracket construction, and more particularly pertains to a new and improved fence mounting bracket wherein the same is arranged for mounting to a fence for securement and suspension of various articles therefrom.

2. Description of the Prior Art

The mounting of various components from fences, such as flower baskets and the like, is desired to enhance economic and aesthetic values of fenced in areas. To accomplish this, various construction has been set forth in the prior art to provide mounting of various components from the brackets. An example is set forth in U.S. Pat. No. 4,582,284 to Veenstra, wherein a crucifix shaped member is mounted within a mesh type fence to provide a projection for suspension of various articles therefrom.

U.S. Pat. No. 4,724,967 to Valiulis sets forth a hanger secured within an opening of a paperboard type merchandising carton.

U.S. Pat. No. 4,881,706 to Sedlik sets forth a holder construction of a generally "U" shaped configuration for support of bags therefrom to permit filling of the bags in a convenient manner.

U.S. Pat. No. 4,155,461 to Young, Jr. sets forth a wall mounting bracket to support various shelving therefrom.

U.S. Pat. No. 1,263,724 to Zagora sets forth a foot rest type bracket mounted upon a slotted radiator face.

As such, it may be appreciated that there continues to be a need for a new and improved fence mounting bracket as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of mounting brackets now present in the prior art, the present invention provides a fence mounting bracket wherein the same is readily and conveniently mounted to an upper surface of a fence rail for permitting suspension and positioning of various components therefrom. As such, the general purpose of the present invention, which will be described subsequently in greater detail, is to provide a new and improved fence mounting bracket which has all the advantages of the prior art mounting brackets and none of the disadvantages.

To attain this, the present invention provides a bracket member arranged for mounting to an uppermost rail of a fence, with a "V" shaped body member formed of memory retentent material, wherein the body member is defined by a plurality of coextensive legs each formed with an arcuate groove adjacent a junction of the legs, and a mounting slot at free ends of each leg, wherein the grooves and slots are directed into the generally planar legs through opposed upper and lower edges of the legs to permit mounting of the legs upon a fence rail and provide the arcuate grooves for support of baskets and the like therefrom.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and sYstems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fence mounting bracket which has all the advantages of the prior art mounting brackets and none of the disadvantages.

It is another object of the present invention to provide a new and improved fence mounting bracket which may be easily and efficiently manufactured and marketed.

It is a further object of the present invention to provide a new and improved fence mounting bracket which is of a durable and reliable construction.

An even further object of the present invention is to provide a new and improved fence mounting bracket which is susceptible of a low cost of manufacture with regard to both materials and labor, and which accordingly is then susceptible of low prices of sale to the consuming public, thereby making such fence mounting brackets economically available to the buying public.

Still yet another object of the present invention is to provide a new and improved fence mounting bracket which provides in the apparatuses and methods of the prior art some of the advantages thereof, while simultaneously overcoming some of the disadvantages normally associated therewith.

Still another object of the present invention is to provide a new and improved fence mounting bracket wherein the same is readily mounted and optionally provided with an organization to effect adjustment in the clamping of the bracket to a fence rail component.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view of the instant invention.

FIG. 4 is an isometric illustration of the instant invention.

FIG. 7 is an orthographic top view of the rod utilized by the instant invention.

FIG. 8 is a top orthographic view of a modified aspect of the instant invention.

DESCRIPTION OF THE PREFERRED EMBODIMENT

Figure 1:
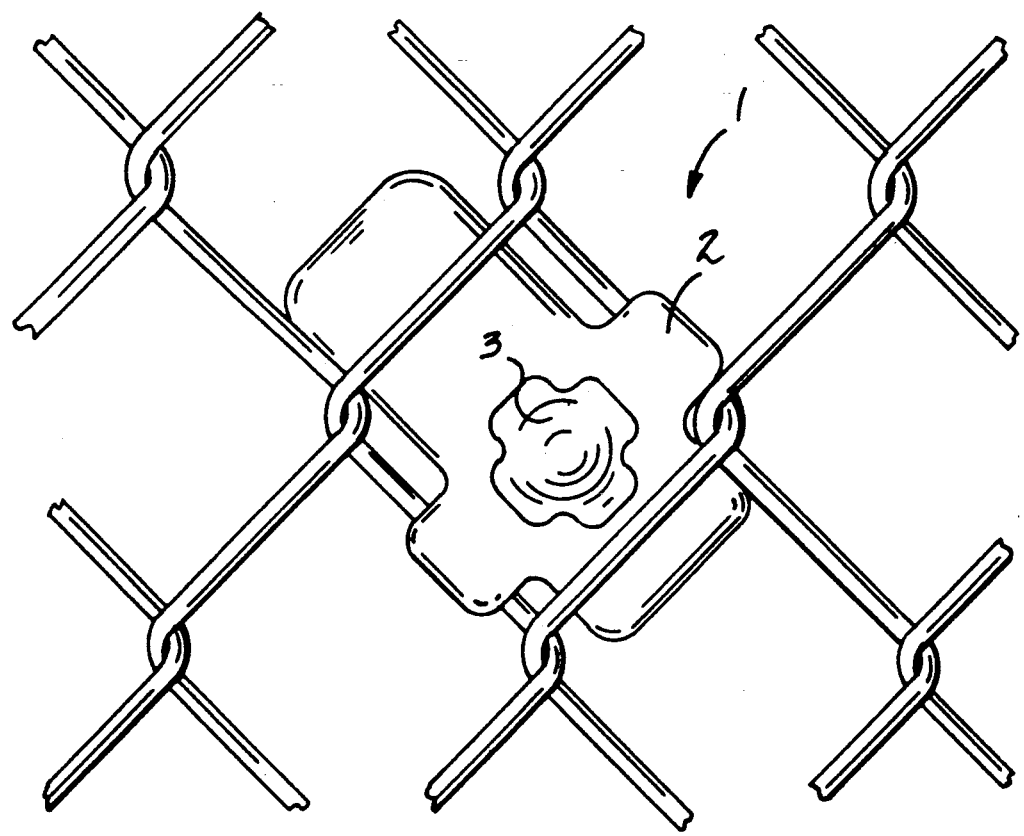
FIG. 1 is an orthographic frontal view, taken in elevational of a prior art fence mounting bracket construction.
Figure 2:
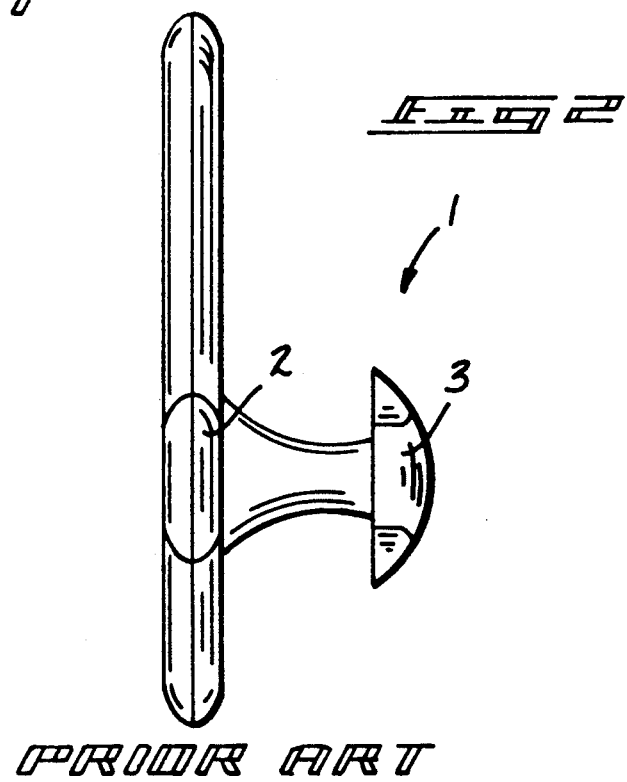
FIG. 2 is an orthographic side view of the bracket construction as set forth in FIG. 1.
Figure 5:
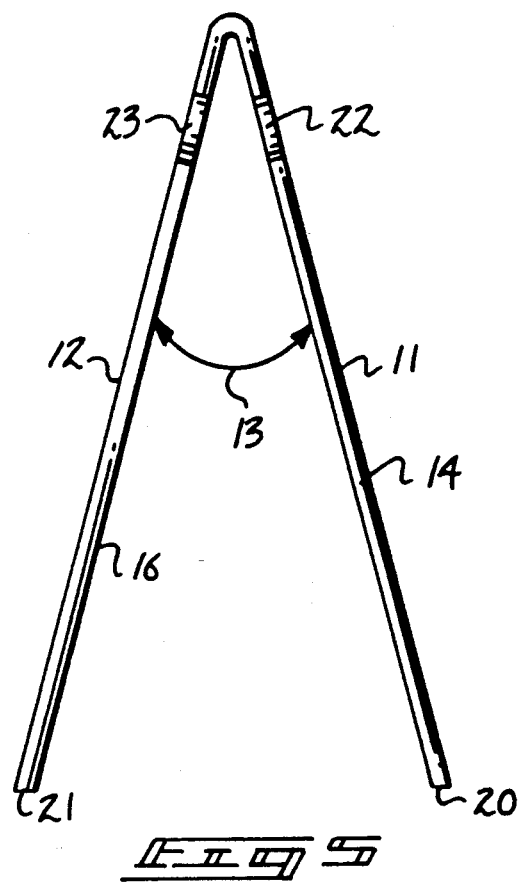
FIG. 5 is an orthographic top view of the instant invention.

With reference now to the drawings, and in particular to FIGS. 1 to 8 thereof, a new and improved fence mounting bracket embodying the principles and concepts of the present invention and generally designated by the reference numerals 10 and 10a will be described.

FIG. 1 illustrates a prior art fence mounting bracket 1, of a generally crucifix shaped body 2 utilizing a projection 3 extending from the body for support of various components therefrom, in a manner as set forth in U.S. Pat. No. 4,582,284.

Figure 6:
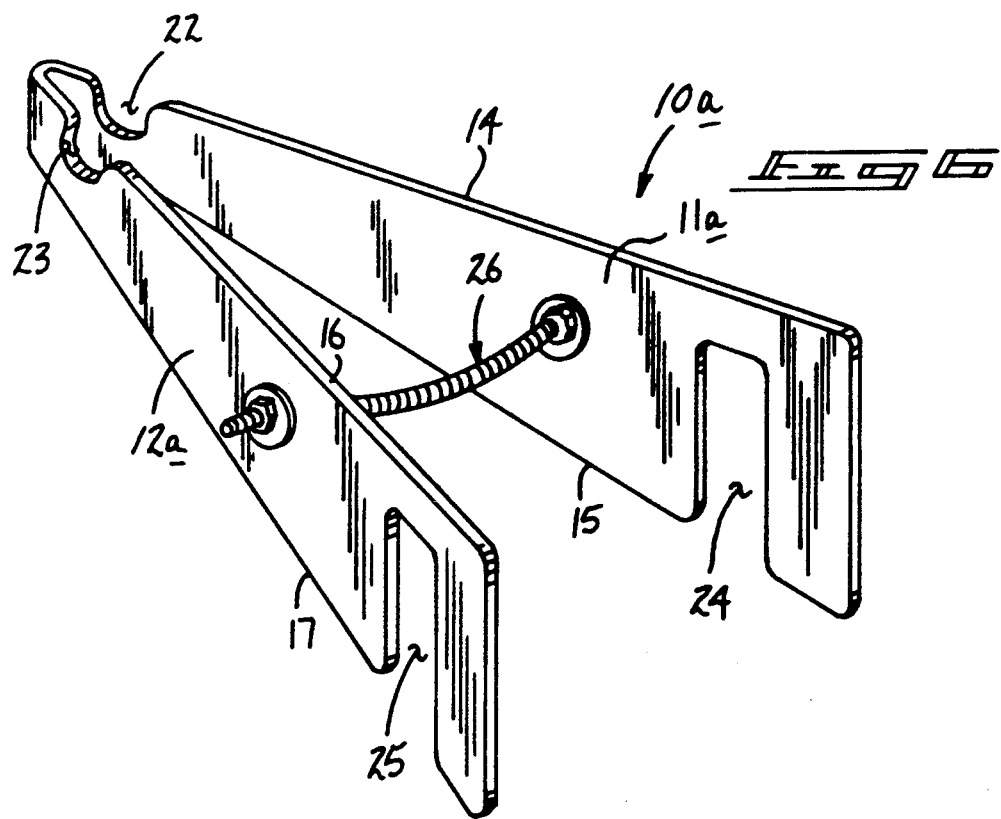
FIG. 6 is an isometric illustration of a modified construction of the instant invention.

More specifically, the fence mounting bracket 10 of the instant invention essentially comprises a unitary "V" shaped body member formed of a memory retentent or shape retentent material defining a first leg 11 coextensive with a second leg 12 defining a first acute included angle 13 therebetween. The first leg 11 includes a first leg top edge 14 and a first leg bottom edge 15. The second leg 12 is defined by a second leg top edge 16 and a second leg bottom edge 17. The top and bottom respective edges of each leg define a second included acute angle 18 therebetween extending from an apex junction 19 mounting the first and second legs 11 and 12 together. Each of the first and second legs 11 and 12 respectively is defined by a first leg end edge 20 and respective second leg end edge 21. A first arcuate groove 22 is directed downwardly from the first leg top edge 14, with a second arcuate groove 23 aligned with the first arcuate groove 22 extending downwardly from the second leg top edge 16, with each groove positioned adjacent the apex junction 19. The aligned grooves thusly permit support of various components mounted therefrom, such as a hanging basket and the like (not shown). A first mounting slot 24 is directed orthogonally relative to the first leg top edge 14 and originates and extends from the first leg bottom edge 15. Similarly, a second mounting slot 25 originates from the second leg bottom edge 17 and extends generally orthogonally relative to the second leg top edge 16. The slots are positioned and arranged generally parallel to the respective first and second leg end edges 20 and 21. The slots receive a fence rail therebetween (see FIG. 8) for mounting of the "V" shaped body member. To enhance securement of the "V" shaped body member, reference to FIGS. 6 or 8 illustrate the use of an arcuate and externally threaded spreader rod 26 that is directed through each first and second leg 11 and 12. A respective first interior and exterior nut member 28 and 28a respectively is positioned to each side of the first leg 11, with a respective second interior and exterior nut member 27 and 27a mounted to each side of the second leg 12, with the nut members positioned between the top and bottom edges of each leg member and directed through the leg members to effect spreading o collapsing of the leg members relative to one another to enhance securement of the leg member to an associated fence rail "F", as illustrated in FIG. 8. It is understood that the nut members are all internally threaded to complementarily mount to the externally threaded spreader rod 26.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fence mounting bracket comprising,
   a unitary "V" shaped body member formed of memory retentent material, including a first leg coextensively arranged relative to a second leg, wherein the first and second legs are integrally joined together at an apex junction defining a first acute included angle between the first and second legs, and
   the first leg defined by a first leg top edge spaced from a first leg bottom edge, with the second leg defined by a second leg top edge spaced from a second bottom edge, and
   the first leg including a first arcuate groove directed downwardly from the first leg top edge adjacent the apex junction, and the second leg including a second arcuate groove aligned with the first arcuate groove directed downwardly from the second leg top edge adjacent the apex junction, and
   the respective first and second leg defined by a respective first and second end edge, with a first mounting slot positioned adjacent the first end edge emanating from the first leg bottom edge, and
   a second mounting slot adjacent the second end edge directed upwardly and originating from the second leg bottom edge, and wherein each top edge of each leg defines a second acute included angle relative to the bottom edge of each leg, and including an arcuate externally threaded spreader rod mounted through the first and second leg and extending through the first and second legs between the first leg top edge and the first leg bottom edge and the second leg top edge and the second leg bottom edge, wherein the spreader rod includes adjustment means for effecting relative spreading of the first leg relative to the second leg.

2. An apparatus as set forth in claim 1 wherein the adjustment means includes a first interior nut member and a first exterior nut member mounted to each side of the first leg, wherein each internally threaded nut member is threadedly secured to the spreader rod about the first leg, with a second interior nut member and a second exterior nut member mounted to each side of the second leg and threadedly secured to the spreader rod to permit selective rotation of each nut member relative to the spreader rod.

* * * * *